UNITED STATES PATENT OFFICE.

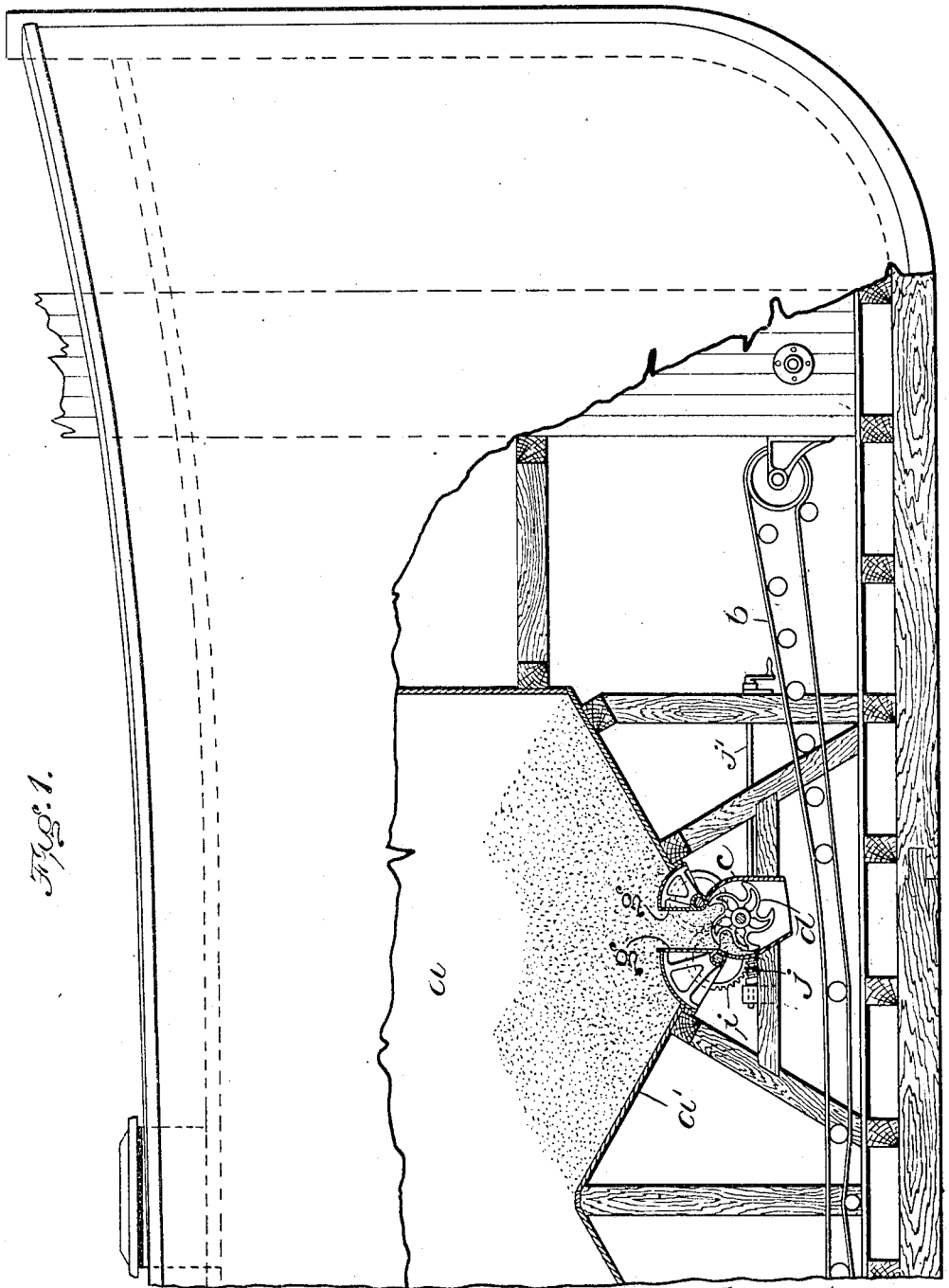

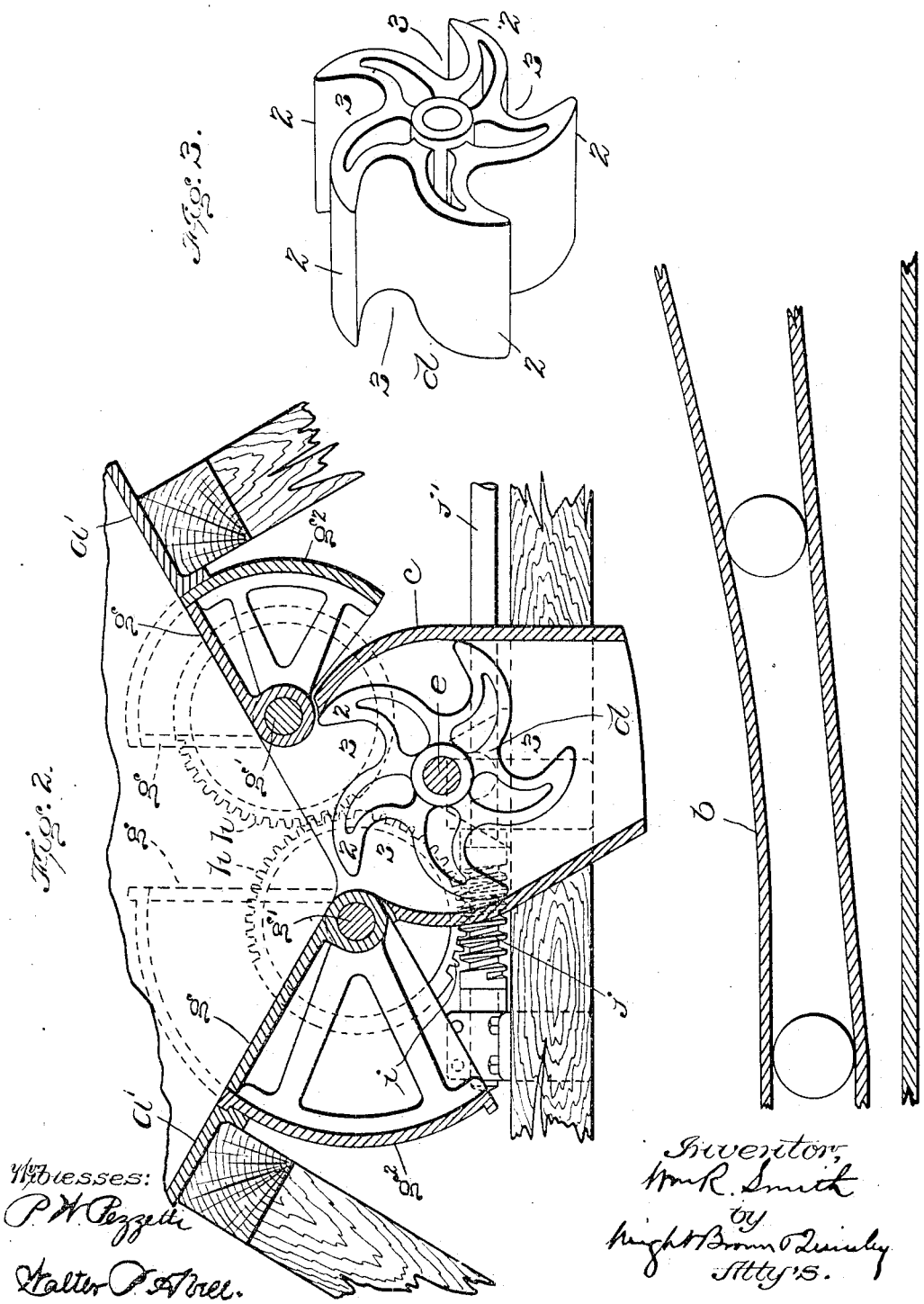

WILLIAM R. SMITH, OF BUFFALO, NEW YORK, ASSIGNOR OF ONE-HALF TO HARRISON D. FOLINSBEE, OF BUFFALO, NEW YORK.

APPARATUS FOR FEEDING ORE, COAL, &c.

SPECIFICATION forming part of Letters Patent No. 766,539, dated August 2, 1904.

Application filed November 2, 1903. Serial No. 179,486. (No model.)

*To all whom it may concern:*

Be it known that I, WILLIAM R. SMITH, of Buffalo, in the county of Erie and State of New York, have invented certain new and useful Improvements in Apparatus for Feeding Ore, Coal, &c., of which the following is a specification.

This invention relates to means for removing or unloading cargoes of material in lumps or fragments—such as metallic ore, coal, grain, &c.—and particularly to unloading means comprising an endless conveyer-belt running in the space between the bottom of the hold and the bottom of the hull of a barge or vessel, the said conveyer receiving the material from outlets in the bottom of the hold and conducting it to suitable lifting apparatus at one end of the vessel.

The invention has for its object to provide simple and effective means for insuring a uniform and regular passage of the material from the hold to the conveyer and to guard against liability of either the clogging of the outlet and the stoppage of the flow of material or an excessively rapid flow liable to overload the conveyer and cause the material to overflow therefrom.

A particular object aimed at by my invention is to distribute the material uniformly along the surface of the conveyer, so that the material instead of being deposited upon the conveyer in isolated heaps or masses forms a practically continuous layer, so that when the belt assumes a steep incline in conveying the material there will be no independent masses of material to slip or slide down the said incline, the continuity of the material making itself-supporting or free from liability to slide backwardly.

The invention also has for its object to provide efficient means for breaking up a mass of material which may have become packed and formed into an arch over the mouth of the outlet.

The invention consists in the improvements which will now proceed to describe and claim.

Of the accompanying drawings, forming a part of this specification, Figure 1 represents a partial side elevation and partial vertical section showing a part of a hull of a barge or vessel provided with a feeding apparatus embodying my invention. Fig. 2 represents an enlargement of a portion of Fig. 1. Fig. 3 represents a perspective view of the rotary gate shown in Figs. 1 and 2.

The same characters of reference indicate the same parts in all the figures.

In the drawings, $a$ represents the hold of a barge or other vessel the bottom of which is or may be composed of a series of hoppers $a'$ each having an outlet in its lower portion. In the space between the hoppers $a'$ and the bottom of the hull of the vessel is a suitable conveyer $b$, which is preferably a belt adapted to convey material deposited upon it from the hold $a$ to a suitable lifting apparatus with which the vessel is provided.

$c$ represents a chute or outlet through which the material passes from the hold $a$ to the conveyer $b$, the said chute being preferably arranged at the bottom portion of a hopper $a'$.

$d$ represents a rotary gate which is affixed to a shaft $e$, extending across the chute $c$ and journaled in suitable bearings, the shaft $e$ and the gate $d$ being rotated by power applied in any suitable way to the shaft. The gate $d$ comprises a series of curved wings 2, which are formed and arranged so that the front side of each wing and the back side of the next wing form a pocket 3. The outer portions of the wings 2 are approximately tangential to a circle concentric with and surrounding the shaft $e$, and the outer ends of the wings are preferably brought to an edge which is sufficiently acute to reduce by a cutting action large lumps or fragments which may stand across the path in which the outer ends of the wings move. The ends of the rotary gate $d$ are in close proximity to the sides of the chute $c$, so that only the portions of the material being fed that are contained in the pockets 3 can pass through the chute. The upper portion of the chute $c$ is preferably contracted, so that its receiving end, which is elevated above the shaft $e$, is of a width approximating the distance between the outer end of each wing 2 and the next. It will be seen that the rotation of the gate d causes each of the pockets to receive a charge of material when it is at the upper portion of the chute and to deliver its charge at the lower portion of the chute. The close proximity of the pockets 3 to each other causes a discharge which, although intermittent, is so nearly continuous that the material is distributed along the conveyer b in a practically continuous layer. The tangential arrangement of the outer portions of the wings 2 and their rigid or relatively sharp cutting edges enable the wings to force their way with the minimum of resistance through the mass of material entering the upper portion of the chute. If the wings were radial instead of tangential at their outer portions, the resistance to the rotation of the rotary gate by the mass of superincumbent material would be considerably greater. It will be seen that my improved rotary gate insures a practically uniform passage of the material from the hold to the belt regardless of the size of the fragments or pieces composing the material—that is to say, material, such as ore, consisting of pieces of various sizes will be fed with practically the same regularity and uniformity as assorted coal or grain. The rotary gate exerts a constant control over the outlet, so that there is no liability of a more rapid feeding of the material when its members are small and of uniform size than when they are relatively large and of varying size.

It sometimes happens that the material being fed becomes packed in the lower portion of the hold or receptacle over the outlet and ceases to flow, the packed material forming an arch extending across the outlet. For the purpose of breaking an arch thus formed I provide means for varying the width of the receiving or upper end of the chute c, so that the opposite sides of said receiving end can be moved away from each other by degrees to release an arch of material that may have formed between said ends. In this embodiment of my invention I show two plates $g$ $g$, forming the sides of upwardly-extending continuations of the chute c, the upper ends of said plates being the upper ends of the receiving end of the chute. The plates $g$ $g$ are mounted upon shafts $g'$ $g'$, which are journaled in fixed bearings and are adapted to be rotated to cause the plates $g$ $g$ to stand in a substantially vertical position, as shown by dotted lines in Fig. 2, or in an inclined position, as shown by full lines in said figure, or at any intermediate position. When the plates $g$ $g$ are in position to contract the receiving end of the chute, the material is prevented from escaping behind said plates by segmental wings or extensions $g^2$ $g^2$, affixed to the plates $g$ $g$. In case the material becomes packed above the plates $g$, so that an arch is formed preventing the downward movement of the material, the plates $g$ $g$ are swung outwardly by mechanism provided for that purpose sufficiently to deprive the ends of the arch of its supports, whereupon the packed material will fall, the obstruction being thus removed. A relatively slow outward movement of the plates $g$ will be sufficient for the purpose stated. In case another arch is formed the plates $g$ $g$ may be given another outward movement, and so on. The means here shown for adjusting the plates $g$ $g$ comprise gear-segments $h$ $h$, affixed to the shafts $g'$, a worm-gear segment $i$, affixed to one of the shafts $g'$, and a worm $j$ on a shaft $j''$ journaled in fixed bearings, said worm meshing with the segment $i$. Power may be applied to the shaft $j''$ to rotate the worm $j$ in any suitable manner.

One of the sides of the chute c—namely, the side at the left, as shown in Fig. 2—may be made as an independent piece or part, held in its operative position by springs and adapted to yield outwardly, so that in case a lump of material which cannot be crushed by one of the wings 2 becomes wedged between an advancing wing and the side of the chute said side may yield and prevent breakage of the wing or of the chute.

I claim—

1. An apparatus of the character stated comprising a hold or receptacle having an outlet-chute, a belt conveyer arranged to receive material from said chute, and a rotary gate located in the chute and extending across the same, said gate having curved wings forming pockets which are arranged to deliver charges of material in close proximity to each other upon the conveyer, the edges of the wings being rigid to force their way through resisting material.

2. An apparatus of the character stated comprising a hold or receptacle having an outlet-chute, a belt conveyer arranged to receive material from said chute, and a rotary gate located in the chute and extending across the same, said gate having wings, the outer portions of which are tangentially arranged, the edges of the wings being rigid to force their way through resisting material.

3. An apparatus of the character stated comprising a hold or receptacle having an outlet-chute, a pair of plates forming gates for the receiving end of the chute, said plates being geared together and adjustable for varying the width of the upper or receiving end of said chute, and a rotary gate located in the chute, said gate having wings and pockets.

Signed at Buffalo, New York, October 7, 1903.

WILLIAM R. SMITH.

Witnesses:
CHARLES F. BROWN,
H. D. FOLINSBEE.